United States Patent
Wijmans et al.

(10) Patent No.: US 8,025,715 B2
(45) Date of Patent: *Sep. 27, 2011

(54) PROCESS FOR SEPARATING CARBON DIOXIDE FROM FLUE GAS USING PARALLEL CARBON DIOXIDE CAPTURE AND SWEEP-BASED MEMBRANE SEPARATION STEPS

(75) Inventors: Johannes G. Wijmans, Menlo Park, CA (US); Timothy C. Merkel, Menlo Park, CA (US); Richard W. Baker, Palo Alto, CA (US)

(73) Assignee: Membrane Technology and Research, Inc, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/807,846

(22) Filed: Sep. 13, 2010

(65) Prior Publication Data
US 2011/0005272 A1    Jan. 13, 2011

Related U.S. Application Data

(63) Continuation-in-part of application No. 12/734,941, filed as application No. PCT/US2009/002874 on May 8, 2009.

(60) Provisional application No. 61/127,415, filed on May 12, 2008.

(51) Int. Cl.
*B01D 53/22* (2006.01)

(52) U.S. Cl. ............ 95/51; 95/46; 95/139; 95/236; 96/4; 96/7; 96/9; 62/606; 62/624; 60/274; 60/278

(58) Field of Classification Search ............ 95/45, 46, 95/51, 130, 138, 139, 236; 96/4, 7, 9, 134; 62/600, 606, 624; 60/273, 274, 278
See application file for complete search history.

(56) References Cited

U.S. PATENT DOCUMENTS

| | | | |
|---|---|---|---|
| 4,350,511 A | 9/1982 | Holmes et al. | |
| 4,371,381 A | 2/1983 | Schuftan | |
| 4,462,814 A | 7/1984 | Holmes et al. | |
| 4,639,257 A * | 1/1987 | Duckett et al. | 95/51 |
| 4,923,493 A | 5/1990 | Valencia et al. | |
| 4,931,070 A | 6/1990 | Prasad | |
| 4,990,168 A | 2/1991 | Sauer et al. | |
| 5,034,126 A | 7/1991 | Reddy et al. | |
| 5,233,837 A | 8/1993 | Callahan | |
| 5,240,471 A | 8/1993 | Barbe et al. | |
| 5,500,036 A | 3/1996 | Kalthod | |
| 5,641,337 A | 6/1997 | Arrowsmith | |
| 5,681,433 A | 10/1997 | Friesen et al. | |

(Continued)

OTHER PUBLICATIONS

US 4,981,498, 01/1991, Bikson (withdrawn)

*Primary Examiner* — Jason M Greene
(74) *Attorney, Agent, or Firm* — K. Bean; J. Farrant

(57) ABSTRACT

A gas separation process for treating flue gases from combustion processes, and combustion processes including such gas separation. The invention involves routing a first portion of the flue gas stream to be treated to a carbon dioxide capture step, while simultaneously flowing a second portion of the flue gas across the feed side of a membrane, flowing a sweep gas stream, usually air, across the permeate side, then passing the permeate/sweep gas to the combustor.

20 Claims, 8 Drawing Sheets

U.S. PATENT DOCUMENTS

| | | |
|---|---|---|
| 5,843,209 A | 12/1998 | Ray et al. |
| 6,085,549 A | 7/2000 | Daus et al. |
| 6,478,852 B1 | 11/2002 | Callaghan |
| 6,648,944 B1 | 11/2003 | Baker et al. |
| 7,625,427 B2 * | 12/2009 | Clarke et al. ............. 95/51 |
| 2008/0176174 A1 * | 7/2008 | White et al. ............. 431/5 |

* cited by examiner (not in accordance with invention)

PROCESS FOR SEPARATING CARBON DIOXIDE FROM FLUE GAS USING PARALLEL CARBON DIOXIDE CAPTURE AND SWEEP-BASED MEMBRANE SEPARATION STEPS

This application claims the benefit of U.S. Provisional Application Ser. No. 61/127,415, filed May 12, 2008, PCT Application No. PCT/US09/02874, filed May 8, 2009, and U.S. application Ser. No. 12/734,941, filed Jun. 2, 2010, the disclosures of which are hereby incorporated herein by reference in their entireties.

FIELD OF THE INVENTION

The invention relates to membrane-based gas separation processes, and specifically to processes using a sweep gas on the permeate side of the membranes to remove carbon dioxide from combustion gases.

BACKGROUND OF THE INVENTION

Many combustion processes produce flue gases contaminated with carbon dioxide that contribute to global warming and environmental damage.

Such gas streams are difficult to treat in ways that are both technically and economically practical, and there remains a need for better treatment techniques.

Gas separation by means of membranes is a well established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498; and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

SUMMARY OF THE INVENTION

The invention is a process involving membrane-based gas separation for controlling carbon dioxide emissions from combustion processes, and combustion processes in which carbon dioxide emissions are so controlled.

Combustion exhaust streams or off-gases are typically referred to as flue gas, and arise in large quantities from ovens, furnaces and boilers in all sectors of industry. In particular, power plants generate enormous amounts of flue gas. A modestly sized 100 megawatt coal-based power plant may produce over 300 MMscfd of flue gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. The carbon dioxide concentration in the flue gas is generally up to about 20 vol %.

In addition to gaseous components, combustion flue gas contains suspended particulate matter in the form of fly ash and soot. This material is usually removed by several stages of filtration before the gas is sent to the stack. It is assumed herein that the flue gas has already been treated in this way, if desired, prior to carrying out the processes of the invention.

The process of the invention involves treating the exhaust or flue gas to remove carbon dioxide. In preferred embodiments, the carbon dioxide level of the exhaust gas is reduced to as low as 5 vol % or less, and most preferably to 3 vol % or less. Discharge of such a stream to the environment is much less damaging than discharge of the untreated exhaust.

The combustion process from which the exhaust is drawn may be of any type. The fuel may be a fossil fuel, such as coal, oil or natural gas, or may be from any other source, such as landfill gas, biomass, or other combustible waste. The fuel may be combusted by mixing with air, oxygen-enriched air or pure oxygen.

After the combustion step itself, the flue gas is first subjected to a carbon dioxide capture step. This capture step removes a portion of the carbon dioxide from the emissions stream, and preferably provides it in the form of a concentrated stream, such as greater than 60, 70, or 80 vol % carbon dioxide, and most preferably as a supercritical fluid or liquid high purity product. The concentrated product stream may be sent for sequestration, or for any other use.

The capture step may utilize any separation technology suitable for recovering carbon dioxide from a stream of the exhaust gas concentration. Preferred technologies are absorption, such as amine scrubbing or chilled ammonia sorption, membrane separation, and condensation.

The off-gas stream from the capture step still contains carbon dioxide, but normally at a lower concentration than the raw exhaust stream. Typically, this concentration is up to about 10 vol % carbon dioxide.

The off-gas stream is sent for treatment in a membrane separation unit. The unit contains membranes selectively permeable to carbon dioxide over nitrogen and to carbon dioxide over oxygen. It is preferred that the membrane provide a carbon dioxide permeance of at least about 300 gpu, more preferably at least about 500 gpu and most preferably at least about 1,000 gpu under the operating conditions of the process. A carbon dioxide/nitrogen selectivity of at least about 10 or more preferably 20 under the operating conditions of the process is also desirable.

The off-gas flows across the feed side of the membranes, and a sweep gas of air, oxygen-enriched air, or oxygen flows across the permeate side, to provide or augment the driving force for transmembrane permeation. The sweep stream picks up the preferentially permeating carbon dioxide. The sweep/permeate stream is then withdrawn from the membrane unit and is returned to the combustor to form at least part of the air, oxygen-enriched air or oxygen feed to the combustion step.

By using the oxygen-containing stream destined for the combustor as sweep gas, the membrane separation step is carried out in a very efficient manner, and without introducing any additional unwanted components into the combustion zone.

The process is particularly useful in applications that are energy-sensitive, as is almost always the case when the very large streams from power plants and the like are to be processed.

The process is also particularly useful in separations that are pressure-ratio limited, as will be explained in more detail below.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series and/or parallel flow arrangements as is well known in the art. Any number of membrane modules may be used.

The process may be augmented by operating the membrane unit with higher total pressure on the feed side than on the permeate side, thereby increasing the transmembrane driving force for permeation.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

The residue stream is reduced in carbon dioxide content to less than about 5 vol %, more preferably to less than 3 vol % and most preferably to less than 2 vol %. This stream is typically, although not necessarily, discharged to the environment. The reduction of the carbon dioxide content to 20%, 10% or less of the content in the raw exhaust greatly reduces the environmental impact of discharging the stream.

The invention in a basic embodiment includes three steps: a combustion step, a carbon dioxide capture step, and a sweep-based membrane separation step, operated according to following basic flow scheme:
(a) performing a combustion process by combusting a mixture of a fuel and air, oxygen-enriched air, or oxygen, thereby creating an exhaust stream comprising carbon dioxide and nitrogen;
(b) performing a carbon dioxide capture step to remove a portion of carbon dioxide in concentrated form from the exhaust stream, thereby creating an off-gas stream from the capture step that is less concentrated in carbon dioxide than the exhaust stream;
(c) providing a membrane having a feed side and a permeate side, and being selectively permeable to carbon dioxide over nitrogen and to carbon dioxide over oxygen;
(d) passing at least a portion of the off-gas stream across the feed side;
(e) passing air, oxygen-enriched air or oxygen as a sweep stream across the permeate side;
(f) withdrawing from the feed side a carbon-dioxide depleted vent stream;
(g) withdrawing from the permeate side a permeate stream comprising oxygen and carbon dioxide;
(h) passing the permeate stream to step (a) as at least part of the air, oxygen-enriched air or oxygen used in step (a).

Circulation of the permeate stream to the combustion step is very advantageous, as it helps to build up the carbon dioxide concentration that passes to the carbon dioxide capture step, facilitating good carbon dioxide removal in this step.

In a preferred case, the carbon dioxide capture step also includes a membrane separation step, and the process comprises the following steps:
(a) performing a combustion process by combusting a mixture of a fuel and air, oxygen-enriched air, or oxygen, thereby creating an exhaust stream comprising carbon dioxide and nitrogen;
(b) providing a first membrane having a first feed side and a first permeate side, and being selective for carbon dioxide over nitrogen;
(c) maintaining a driving force for transmembrane permeation;
(d) passing at least a portion of the exhaust stream across the first feed side;
(e) withdrawing from the first feed side a first residue stream depleted in carbon dioxide compared with the exhaust stream;
(f) withdrawing from the first permeate side a first permeate stream comprising carbon dioxide;
(g) providing a second membrane having a second feed side and a second permeate side, and being selectively permeable to carbon dioxide over nitrogen and to carbon dioxide over oxygen;
(h) passing at least a portion of the first residue stream across the second feed side;
(i) passing air, oxygen-enriched air or oxygen as a sweep stream across the second permeate side;
(j) withdrawing from the second feed side a carbon-dioxide depleted vent stream;
(k) withdrawing from the second permeate side a second permeate stream comprising oxygen and carbon dioxide;
(l) passing the second permeate stream to step (a) as at least part of the air, oxygen-enriched air or oxygen used in step (a).

In preferred embodiments of this type, the permeate stream from the first membrane separation step can be cooled and compressed to produce a fluid carbon dioxide product for sequestration or use.

The first membrane separation step is typically, but not necessarily, operated as a pressure-driven step, using a compressor to compress the gas entering the feed side of the membrane, a vacuum pump to reduce the pressure on the permeate side of the membrane, or both.

Many membrane materials are very permeable to water vapor, so the first permeate stream tends to contain high concentrations of water vapor, such as 20 vol %, 30 vol % or more. The co-permeation of water with the carbon dioxide is helpful, as the water dilutes the carbon dioxide concentration on the permeate side and helps maintain driving force for transmembrane permeation for carbon dioxide.

Optionally, the beneficial effect of copermeation of water can be maintained or enhanced by adding water vapor to the first membrane feed stream if it is not saturated, or by injecting steam or water vapor between the individual membrane modules, especially towards the residue end of the train of modules.

As another alternative, the driving force in the first membrane separation step may be augmented by using a steam sweep on the permeate side of the membrane.

In all of these cases, the water present in the permeate stream may easily be removed by cooling the stream to condense the water after the permeate stream is withdrawn from the membrane unit.

As mentioned above, the invention is particularly valuable as it relates to the treatment of power plant flue gas. In this aspect, preferred processes incorporate three discrete membrane separation steps: (i) one in the carbon dioxide capture step, operating generally as described above, (ii) an additional membrane separation step operated in conjunction with compression and condensation to recover a liquid or supercritical fluid carbon dioxide product from the carbon dioxide capture step, and (iii) the sweep-based step in which incoming air or oxygen for the combustor is used as sweep gas, also operating in the same general manner as described above.

A representative embodiment of a process of this type for treating such flue gas includes the following steps:
(a) performing a first membrane separation step by;
 (i) providing a first membrane unit containing a first membrane having a first feed side and a first permeate side;
 (ii) providing a first driving force for transmembrane permeation by maintaining the first permeate side under a partial vacuum;
 (iii) passing the flue gas stream across the first feed side;
 (iv) withdrawing from the first feed side a carbon-dioxide-depleted first residue stream;
 (v) withdrawing from the first permeate side a carbon-dioxide-enriched first permeate stream;
(b) compressing the first permeate stream;
(c) cooling the first permeate stream thereby condensing water to provide a compressed, cooled first permeate stream;
(d) performing a combination of a second membrane separation step and a liquefaction step to form a liquid carbon dioxide product;
(e) performing a third membrane separation step by;
 (i) providing a third membrane unit containing a third membrane having a third feed side and a third permeate side, and being selectively permeable to carbon dioxide over nitrogen;
 (ii) passing at least a portion of the first residue stream across the third feed side;
 (iii) passing air as a sweep stream across the third permeate side;
 (iv) withdrawing from the third feed side a treated flue gas stream;
 (v) withdrawing from the third permeate side a third permeate stream comprising oxygen and carbon dioxide;
(f) using the third permeate stream as an air supply stream for a combustor in the power plant.

The second membrane separation step is typically, but not necessarily, operated as a pressure-driven step, using a compressor to compress the gas entering the feed side of the membrane, a vacuum pump to reduce the pressure on the permeate side of the membrane, or both.

A process using three membrane separation steps in this way can take a flue gas stream containing 5 vol %, 10 vol % 15 vol % or 20 vol % carbon dioxide, for example, and produce only water, liquefied or supercritical fluid carbon dioxide, and a treated flue gas containing just a few percent, such as 4 vol %, 2 vol %, 1 vol % or less of carbon dioxide for discharge.

In the embodiments described above, the carbon dioxide capture step and the sweep-based membrane separation step are performed in series, with the off-gas from the capture step being treated by the membrane separation step. In an alternative embodiment of the invention, similar carbon dioxide capture and membrane separation steps may be performed in parallel. That is, one portion of the exhaust stream from the combustion process is routed to a carbon dioxide capture step, and the other portion is routed to a sweep-based membrane separation step. A basic embodiment of a process of this type includes the following steps:

(a) performing a combustion process by combusting a mixture of a fuel and air, oxygen-enriched air, or oxygen, thereby creating an exhaust stream comprising carbon dioxide and nitrogen;
(b) performing a carbon dioxide capture step to remove a portion of carbon dioxide in concentrated form from a first portion of the exhaust stream;
(c) providing a membrane having a feed side and a permeate side, and being selectively permeable to carbon dioxide over nitrogen and to carbon dioxide over oxygen;
(d) passing a second portion of the exhaust stream across the feed side;
(e) passing air, oxygen-enriched air or oxygen as a sweep stream across the permeate side;
(f) withdrawing from the feed side a carbon-dioxide depleted vent stream;
(g) withdrawing from the permeate side a permeate stream comprising oxygen and carbon dioxide;
(h) passing the permeate stream to step (a) as at least part of the air, oxygen-enriched air or oxygen used in step (a).

The exhaust stream typically comprises flue gas from a coal-fired power plant. An objective of the invention is to substantially increase the concentration of carbon dioxide in the exhaust stream from the combustor or boiler, so that the portion of the exhaust stream that is sent to the carbon dioxide capture step can itself be concentrated and captured more efficiently than would otherwise be possible. This is achieved by returning the carbon dioxide-enriched permeate stream from the membrane separation step to the combuster. The exhaust stream from the combustor preferably comprises at least 15 vol % $CO_2$; more preferably, at least 20 vol % $CO_2$; and, most preferably, at least 25 vol % $CO_2$.

If the gas needs to be transported to reach the equipment that carries out the carbon dioxide capture step, such as an amine plant, transportation of the carbon dioxide enriched exhaust gas is far simpler and less costly than transporting low concentration raw flue gas from a conventional power plant. Typically, the amount of gas that must be pipelined or otherwise transported to the carbon dioxide capture plant is reduced several fold, such as to 50%, 30%, or even 25% or less of the amount that would need to be sent if the membrane separation step were absent. This is a significant benefit of the invention.

The portion of the exhaust stream that is sent to the carbon dioxide capture step (i.e., the "first portion") preferably comprises between about 10 vol % and about 75 vol %. This can also be expressed as a split ratio, where the ratio defines the relative proportions of the flue gas sent to the carbon dioxide capture step and the membrane separation step. In general, therefore, we prefer to operate with a split ratio of between 1:10 and 3:1.

The carbon dioxide capture step preferably comprises at least one process selected from the group consisting of absorption, adsorption, liquefaction, and membrane separation, and most preferably comprises membrane separation or cryogenic condensation.

The other ("second") portion of the exhaust stream is sent to a sweep-based membrane separation step. The second portion of the exhaust stream may be sent to the membrane unit without compression, or may be compressed. Slight compression to a pressure from between about 1.1 bar up to about 5 bar, such as 2 bar, is preferred. The sweep stream preferably follows a sweep flow direction across the permeate side, the off-gas stream follows a feed flow direction across the feed side, and the sweep flow direction is substantially countercurrent to the feed flow direction. The membrane preferably exhibits a carbon dioxide permeance of at least 500 gpu, and a selectivity in favor of carbon dioxide over nitrogen of at least 10:1, under process operating conditions.

Another objective of the invention is to minimize the amount of $CO_2$ in the vent stream, which is often released directly to the environment. As such, the vent stream preferably comprises less than 5 vol % $CO_2$; more preferably, less than 4 vol % $CO_2$; and, most preferably, less than 3 vol % $CO_2$.

BRIEF DESCRIPTION OF THE DRAWINGS

FIG. 3 is an embodiment of the invention as it relates to treatment of flue gas from a power plant or the like.

FIG. 4 is an alternative embodiment of the invention as it relates to treatment of flue gas from a power plant or the like.

DETAILED DESCRIPTION OF THE INVENTION

Gas percentages given herein are by volume unless stated otherwise.

Pressures as given herein are in bar absolute unless stated otherwise.

The terms exhaust gas, off-gas, flue gas, and emissions stream are used interchangeably herein.

The invention is a process for controlling carbon dioxide emissions from combustion processes by membrane-based gas separation, and combustion processes including such gas separation.

Figure 1:
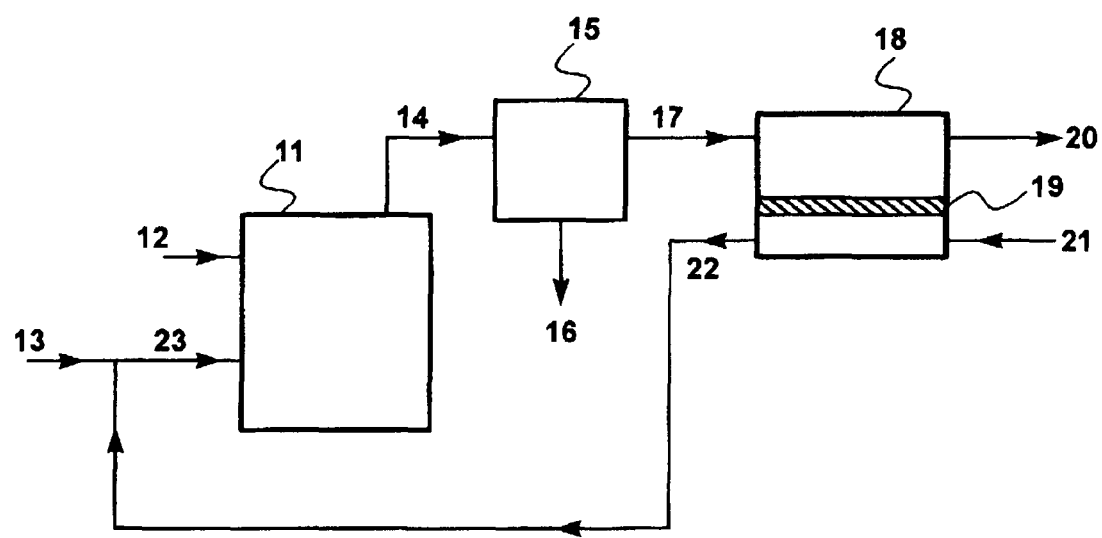
FIG. 1 is a schematic drawing of a flow scheme for a basic embodiment of the invention as it relates to a typical combustion process.

A simple flow scheme for a basic embodiment of the invention is shown in FIG. 1. Referring to this figure, fuel stream 12, and air, oxygen-enriched air or oxygen stream 23, are introduced into a combustion step or zone, 11. Stream 23 is made up of sweep stream, 22, discussed below, and additional air or oxygen supply, stream 13.

Combustion exhaust stream, 14, typically containing 10-20 vol % carbon dioxide, is withdrawn. This stream usually contains at least carbon dioxide, water vapor and nitrogen, as well as the other components mentioned in the Summary section above.

The stream is sent, at least in part, to carbon dioxide capture step, 15. This step may be carried out using any technology or combination of technologies that can create a concentrated carbon dioxide stream from the exhaust stream.

The capture step yields a concentrated carbon dioxide product stream, 16, preferably containing greater than 60, 70, or 80 vol % carbon dioxide or more. This stream may be in the gas or liquid phase, and may comprise purified liquid carbon dioxide, for example. The concentrated stream may be sent for sequestration, or used or disposed of in any other appropriate way.

The off-gas stream, 17, from the capture step still contains carbon dioxide, at a lower concentration than the raw exhaust stream. Typically, but not necessarily, this concentration is up to about 10 vol % carbon dioxide for coal-fired boilers, lower for gas-fired boilers. The off-gas stream is sent for treatment in membrane separation step or unit, 18. The unit contains membranes, 19, that are selectively permeable to carbon dioxide over nitrogen and to carbon dioxide over oxygen.

The off-gas flows across the feed side of the membranes; a sweep gas of air, oxygen-enriched air or oxygen, stream 21, flows across the permeate side.

The sweep stream picks up the preferentially permeating carbon dioxide, and the resulting permeate stream, 22, is withdrawn from the membrane unit and is combined with stream 13 to form the air or oxygen feed, 23, to the combustor.

In the alternative, stream 13 may be omitted and the entirety of the oxygen-containing feed to the combustor may be provided by the sweep stream.

The residue stream, 20, is reduced in carbon dioxide content to less than about 5 vol %, more preferably to less than 3 vol % and most preferably to less than 2 vol %. Typically, this stream is discharged to the environment.

One of the additional beneficial consequences of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

For example, conventional combustion of coal with air usually produces an off-gas containing 10-12% carbon dioxide, whereas returning carbon dioxide to the combustion chamber in accordance with the teachings herein can increase the off-gas concentration to about 15 or 20 vol %.

From FIG. 1, it may be seen that the process of the invention incorporates three unit operations: a combustion step, a carbon dioxide capture step and a final membrane separation step, in that order.

The combustion step may be carried out in any way limited only in that it results in an off-gas, exhaust gas or flue gas containing carbon dioxide. Such combustion processes occur throughout industrialized society. Representative processes include those in which the combustion step is used to provide heat for an oven or furnace, such as a blast furnace or rotary kiln, for example, a lime or cement kiln. Other important processes are those in which the combustion step is used to generate steam to operate a turbine or other equipment to perform mechanical work or generate electric power. In yet other processes, the combustion gases themselves are used as a source of power to drive a turbine or the like, and may be treated before or after they have been used in the turbine. Further examples of combustion processes are those used to supply heat for refinery operations, such as certain types of cracking or reforming.

The fuel for the combustion step may be any fuel that can be combusted with oxygen, including, but not limited to, coal, coke, wood, biomass, solid wastes, oils and other natural and synthetic liquid fuels of all grades and types, and hydrocarbon-containing gas of any type, such as natural gas, landfill gas, coal mine gas, gasifier syngas, or the like.

The oxygen with which the fuel is combusted may be supplied in the form of high purity oxygen, oxygen-enriched air, normal air or any other suitable oxygen-containing mixture.

The carbon dioxide capture step may be carried out using membrane or non-membrane technology, and may involve one or more than one type of separation procedure. In the event that membrane technology is used in whole or part for this step, the capture step remains a discrete unit operation separate from the subsequent membrane separation step, 18.

Representative methods that may be used to capture carbon dioxide in this step include, but are not limited to, physical or chemical sorption, membrane separation, compression/low temperature condensation, adsorption, or any other known technology. Preferred technologies are absorption, such as amine scrubbing or chilled ammonia sorption, condensation, membrane separation, and combinations of these.

Low-temperature or cryogenic condensation and absorption into an amine solution are the most common methods in current industrial use for capturing carbon dioxide and need no detailed description herein. Either method is well suited for use in the present invention. Methods of recovering liquid carbon dioxide by cryogenic condensation or distillation are well known in the art. Preferred processes include variants of the well-known Ryan-Holmes process, in which a light hydrocarbon liquid or liquid mixture is added to the column to prevent formation of carbon dioxide solids or azeotropes in the column. Various specific techniques for carrying out low temperature condensation are taught, for example in U.S. Pat. Nos. 4,371,381; 4,923,493; 5,233,837. The Ryan-Holmes process is taught in U.S. Pat. Nos. 4,350,511 and 4,462,814, for example.

Methods of recovering carbon dioxide by absorption are also commonly used. In brief, these methods involve absorbing the carbon dioxide into a sorbent solution by physical or chemical interaction, then stripping the gas from the solution and recirculating the regenerated sorbent. Various sorbents may be used; most commonly the sorbent is amine-based and may include a single alkanolamine or a mix of amines. Other sorbents that may be used include chilled ammonia, as in the Alstom process, or other specialized proprietary solvents.

The sorbent solution may be regenerated by steam stripping, and the carbon dioxide recovered from the stripping vapor by cooling and condensing the water. A representative process of this type that may be used is the Fluor Daniel Econamine FG™ process, which uses a monoethanolamine (MEA) based sorbent system. Very detailed descriptions of such processes can be found in the literature, for example in *Gas Purification*, A. Kohl and R. Nielsen (Fifth Edition, Gulf Publishing Co., Houston, Tex., 1997), pages 1188-1237.

It is less preferred to use membrane separation alone for the carbon dioxide capture step as it is hard to reach a high carbon dioxide concentration in the permeate stream without using multiple membrane stages. An example of a three-stage membrane unit for carbon dioxide recovery from natural gas streams is given in U.S. Pat. No. 6,648,944.

Two or more different separation technologies may also be combined in this step; membrane separation may be combined with cryogenic condensation, either upstream or downstream of the condensation step, for example, or gas released in the stripping step of the absorption process may be liquefied by condensation. Examples of such combined processes are taught in U.S. Pat. Nos. 4,639,257; 4,990,168; 5,233,837; and 6,085,549, for example, all of which are incorporated herein by reference.

The third unit operation is membrane separation. Turning to the membrane separation step, 18, as mentioned in the summary section, the membranes used in this step should exhibit high permeance for carbon dioxide, as well as high selectivity for carbon dioxide over nitrogen.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50 or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. To provide countercurrent flow of the sweep gas stream, the modules preferably take the form of hollow-fiber modules, plate-and-frame modules or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 18 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Although the membrane modules are typically arranged horizontally, a vertical configuration may in some cases be preferred to reduce the risk of particulate deposition on the membrane feed surface.

Turning to the operating conditions of step 18, the separation of components achieved by the membrane unit depends not only on the selectivity of the membrane for the components to be separated, but also on the pressure ratio.

By pressure ratio, we mean the ratio of total feed pressure/total permeate pressure. In pressure driven processes, it can be shown that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 21, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate side to a level below its partial pressure on the feed side. The use of the sweep gas stream 21 maintains a low carbon dioxide partial pressure on the permeate side, thereby providing driving force.

The partial pressure on the permeate side may be controlled by adjusting the flow rate of the sweep stream to a desired value. In principle the ratio of sweep gas flow to feed gas flow may be any value that provides the desired results, although the ratio sweep gas flow:feed gas flow will seldom be less than 0.1 or greater than 10, but will most typically be 2 or less. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side, or may adversely affect the stoichiometry in the reaction vessel.

Typically and preferably, the flow rate of the sweep stream should be between about 20% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 1.1 to 2 bar, can be helpful and can provide part of a total carbon dioxide capture and recovery process that is relatively energy efficient, as shown in the examples below.

Figure 2:
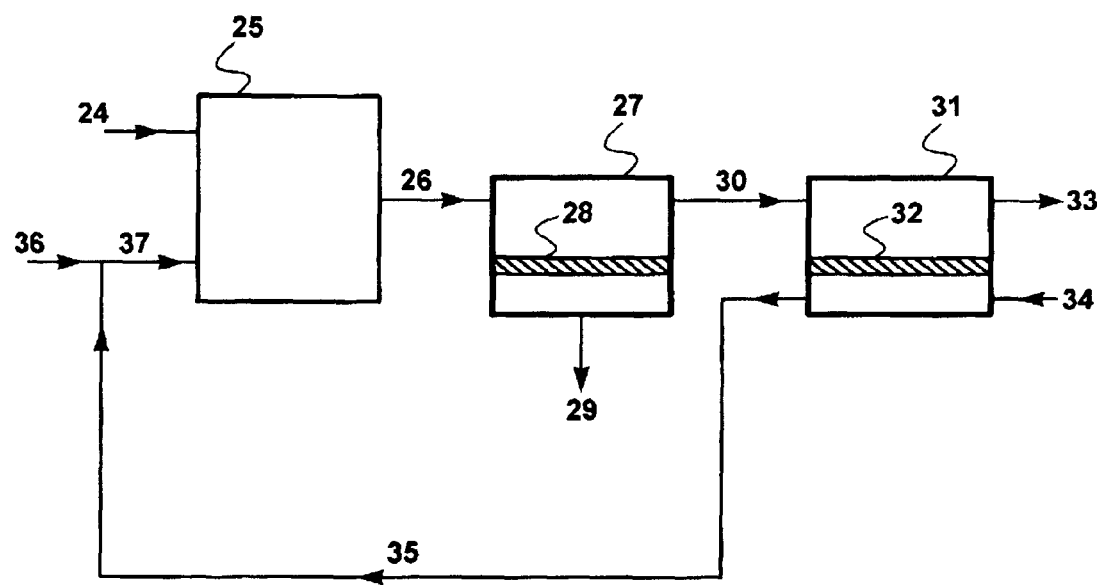
FIG. 2 is a schematic drawing of a flow scheme for an embodiment of the invention in which a membrane separation step is used in the carbon dioxide capture step.

The process in an embodiment in which the carbon dioxide capture step includes membrane separation is shown in FIG. 2. It will be appreciated by those of skill in the art that this, like FIG. 1 and the other flow schemes shown herein, is a very simple block diagram, intended to make clear the key unit operations of the process of the invention, and that an actual process train will usually include many additional steps of a standard type, such as heating, chilling, compressing, condensing, pumping, various types of separation and/or fractionation, as well as monitoring of pressures, temperatures and flows, and the like. It will also be appreciated by those of skill in the art that the details of the unit operations may differ from case to case.

Referring to this figure, fuel, stream 24, and air, oxygen-enriched air or oxygen stream 37, are introduced into a combustor, 25.

Combustion off-gas stream, 26, is sent, at least in part, to the carbon dioxide capture step, in this case first membrane separation step or unit, 27. This unit contains membranes, 28, that are selectively permeable to carbon dioxide over nitrogen. This step may be pressure driven, by operating with a higher pressure on the feed side than on the permeate side. This may be achieved by compressing the feed, or more preferably, as the stream is smaller in volume, by pulling a partial vacuum on the permeate side, or by a combination of slight elevation of the feed pressure and slight vacuum on the permeate side.

This step separates the off-gas stream into a carbon dioxide concentrated permeate stream, 29, and a carbon dioxide depleted residue stream, 30. The permeate stream will also typically be rich in water vapor, which may be easily condensed by cooling the stream. Optionally, the permeate stream may then be sent to compression/low-temperature condensation or distillation to form a high purity carbon dioxide product.

Optionally, the driving force in the first membrane separation step may be augmented by using a steam sweep on the permeate side of the membrane. This can provide a significant improvement in the separation achieved in this step, as well as a reduction in energy consumption, since the steam used can be recovered from the permeate gas by simple condensation before the gas enters the vacuum pump.

Residue stream, 30, is passed as feed to second membrane separation unit or step, 31, containing membranes, 32, that are selectively permeable to carbon dioxide over nitrogen and to carbon dioxide over oxygen.

The residue stream flows across the feed side and a sweep gas of air, oxygen-enriched air or oxygen, stream 34, is introduced to the permeate side inlet of the membrane unit and flows across the permeate side, preferably in a flow pattern that is at least partly or substantially countercurrent to the flow pattern on the feed side. The ratio of the inlet flow rates of the feed and sweep streams is most preferably maintained at roughly 1:1, such that the sweep stream flow rate is between about 80% and 120% of the feed flow rate.

The resulting permeate/sweep stream, 35, is withdrawn from the membrane unit and is combined with stream 36 as feed to the combustor. Optionally, stream 36 may be omitted and the entirety of the oxygen-containing stream may be provided by the sweep stream.

The residue stream, 33, is depleted in carbon dioxide and is discharged from the process. By following the teachings of the invention, it is possible to reduce the carbon dioxide concentration of the discharged off-gas by at least 80%, 90%, or more compared with the concentration in the raw flue gas. For example, the off-gas from the combustor may contain 20% carbon dioxide and the residue vent gas may contain only 1 or 2% carbon dioxide.

Such a high level of carbon dioxide removal is practically impossible with processes that are purely pressure driven, as the energy requirements to operate the process and the membrane area needed to reach the desired levels of carbon dioxide permeation are excessive.

The process is now described in more detail as it relates to a specific preferred embodiment for treating flue gas from a power plant, such as a coal-fired power plant. In this representative process, the carbon dioxide capture step is assumed to be made up of a membrane separation stage, which is similar in function to membrane separation step 27 in FIG. 2, plus a third membrane separation step and a carbon dioxide recovery step that yields a liquid or supercritical fluid purified carbon dioxide product. The third membrane separation step and the product recovery step may be carried out with the membrane separation step preceding the product recovery step or vice versa.

Figure 3:
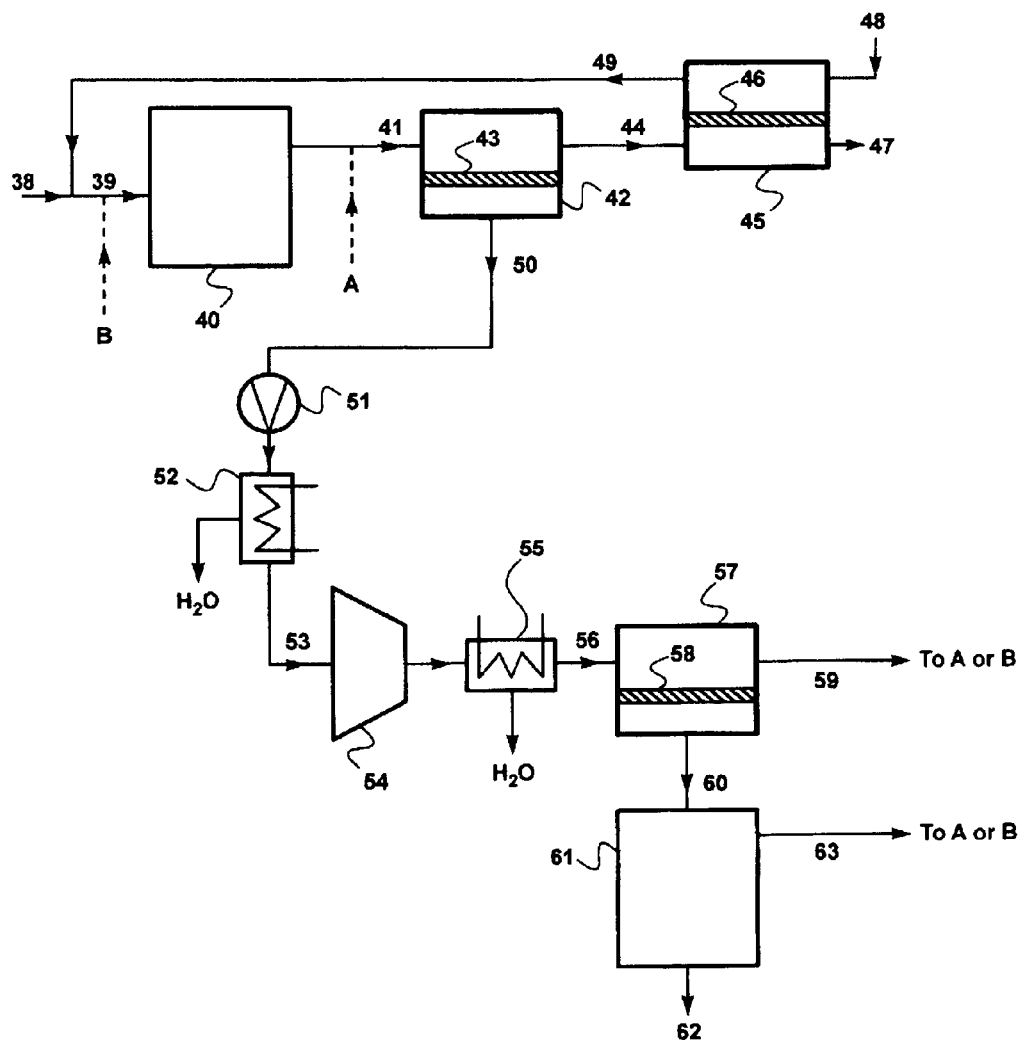

A process in which the membrane separation step precedes a liquefaction step for product recovery is shown schematically in FIG. 3. Referring to this figure, flue gas stream, 41, emanates from the combustors of a power plant, 40, which is fed by stream 39, made up of fuel stream, 38, and air stream, 49. In most coal- or gas-fired power plants, the pressure of this flue gas is just above atmospheric, such as 1.1 or 1.2 bar absolute. However, in some processes, for example, combustion of natural gas for an electric power generation turbine, the flue gas pressure may be higher, such as 2-10 bar.

The flue gas passes to the first section of the carbon dioxide capture step, specifically first membrane separation step, 42. The step is carried out using membranes, 43, having carbon dioxide permeance and selectivity characteristics as described above. This step separates the flue gas into a carbon dioxide depleted residue stream, 44, usually containing less than about 10 vol % carbon dioxide, and a carbon dioxide enriched permeate stream, 50, usually containing at least about 40 vol % carbon dioxide.

In deciding the operating conditions for the membrane separation step, there exists a trade-off between the amount of membrane area required for the separation and the energy consumption to operate the process. In this representative and preferred example, the driving force for transmembrane permeation in this step is shown as being provided by a vacuum pump or train of vacuum pumps, 51, on the permeate side of the first membrane step. The vacuum pumps maintain a pressure down to about 0.1 bar, such as 0.5 bar or 0.2 bar on the permeate side.

The pressure difference across the membrane generated by the vacuum pump(s) is small, so the membrane areas required to achieve the separation required are very large. However, the permeate gas stream passing through the vacuum pump has only a fraction of the volume of the flue gas, so the power used by the vacuum pump is smaller than the power that would be consumed by a compression train operating on the feed gas.

Alternative preferred representative embodiments within the scope of the invention use modest compression of the feed stream, either alone or in conjunction with pulling a slight vacuum on the permeate side. An embodiment with slight feed compression is preferred, for example, in the case of a coal-fired power plant where the flue gas is at 1.1 bar absolute. This gas may be compressed to up to about 5 bar, such as 2 or 3 bar, and a portion of the energy used for the compressors may be recovered by expanding the final treated flue gas stream, 47, in a turbine before final discharge. The use of connected compressor/turbo-expander operations for energy recovery is well known in the art and in power plants in particular.

Aftercooler, 52, knocks out water that has permeated the membranes with the carbon dioxide.

The remaining permeate gas stream, 53, then passes through a compressor or compression train, 54, where it is compressed to a few bar pressure, such as 3 or 4 bar, and then through aftercooler, 55, where additional water is knocked out. The compressed gas forms the feed stream, 56, to the second membrane separation stage, 57, containing membranes, 58, having similar characteristics to those described previously. The permeate stream, 60, from this stage typically contains more than 80% carbon dioxide, and is sent to a cryogenic liquefaction plant, 61, to produce liquefied carbon dioxide product, 62.

The off-gases, 63, from the liquefaction plant, which are mostly nitrogen and oxygen, but which also may contain up to 10, 15 or 20% carbon dioxide, may be returned to the front of the flue gas treatment train at position A as shown, may be returned to the combustor at position B as shown, or may be recirculated, used or discharged in any other desired fashion. Likewise, the residue stream, 59, from the second-stage membrane unit may be returned to the process at position A or B, or sent elsewhere as desired.

The residue gas stream, 44, leaving the first membrane unit normally contains up to about 10% carbon dioxide. This gas passes as feed to the sweep-driven membrane separation step or unit, 45. This step uses membranes, 46, having similar characteristics to those described previously. The feed air, 48, to the power plant burner passes as a sweep gas on the other side of the membranes. Carbon dioxide permeates preferentially through the membranes and is returned with the feed air to the burner in permeate/sweep stream, 49.

The treated flue gas stream, 47, is vented.

The embodiment described above with respect to FIG. 3 is intended to be illustrative of a typical flue gas treatment process and is not intended to limit the scope of the invention. Those of skill in the art will appreciate how to practice the invention as it applies to other combustion processes by following the teachings herein.

Figure 4:
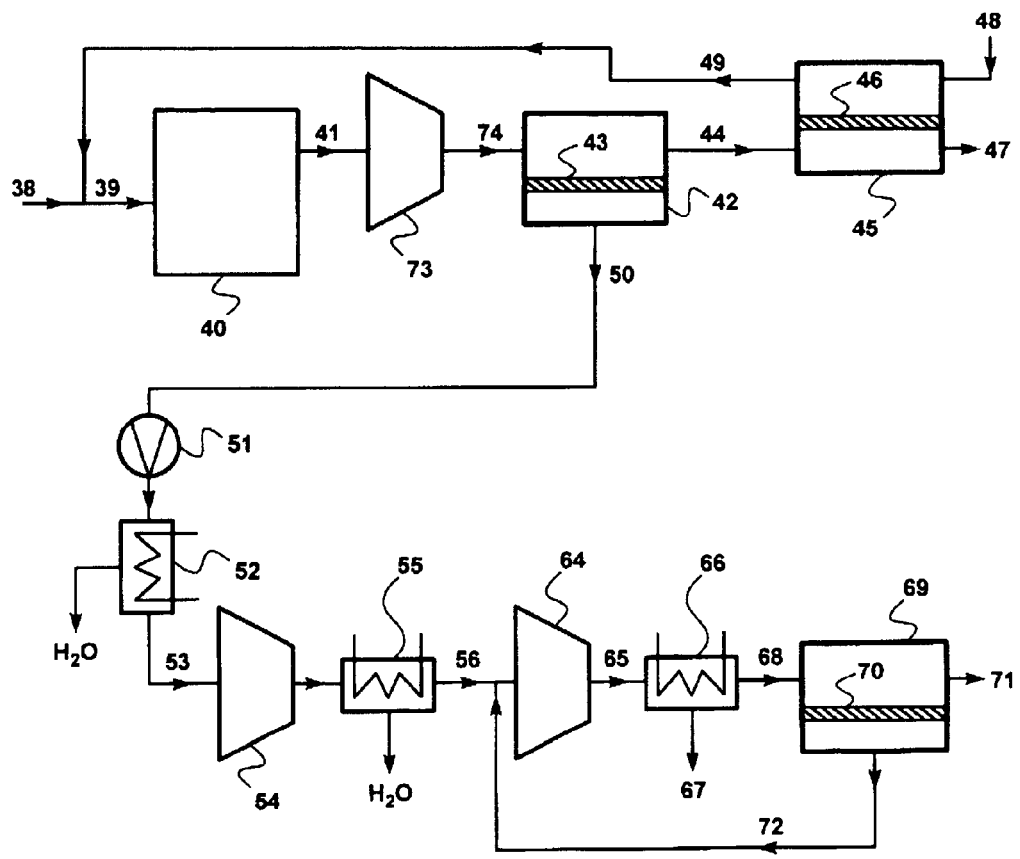

For example, a representative variant of the embodiment of FIG. 3 is shown in FIG. 4, in which like elements are numbered as in FIG. 3. The process of FIG. 3 differs from that of FIG. 4 in that some compression, 73, is used to create a compressed feed stream, 74, at 2 or 3 bar, which forms the feed to membrane separation step, 42.

This design also differs from that of FIG. 3 in the manner in which the compressed gas stream, 56, is processed. In FIG. 3, the stream passes to a membrane separation step, 57, and thence to the liquefaction plant. In FIG. 4, the membrane step is used instead to treat the off-gas from the liquefaction unit, so that the product recovery step precedes the last membrane separation step. Thus, stream 56 enters compression step or train, 64, where the pressure is raised to a suitable pressure for liquefaction, such as 20, 30, 40 bar or above, then passes as compressed stream, 65, to the condensation steps, 66. Here the gas is condensed/distilled at low temperature, typically by heat exchange against propylene or other low-temperature refrigerant, to produce carbon dioxide product stream, 67. The overhead stream, 68, from the carbon dioxide recovery column, is sent to membrane separation step, 69, containing membranes, 70, having similar characteristics to those described previously. The driving force for transmembrane permeation in this membrane unit is provided by the high pressure of the column overhead. The permeate stream, 72, is enriched in carbon dioxide and is recirculated at a suitable point to the compression train for the liquefaction steps, as indicated in the figure, or may be returned elsewhere in the process.

The membrane residue stream, 71, may be returned to the combustor, to the flue gas treatment train before or after compression step 73, or may be used or discharged elsewhere as desired.

In an alternative embodiment of the invention, the carbon dioxide capture step and the sweep-based membrane separation step are performed in parallel, rather than in series or sequence (as in the embodiments described above). Such parallel embodiments are especially useful for treating flue gas from power plants, for example. A portion of the exhaust stream from the combustion process is routed to a carbon dioxide capture step, and the other portion is routed to a sweep-based membrane separation step. A simple flow scheme for this embodiment of the invention is shown in FIG. 5.

Figure 5:
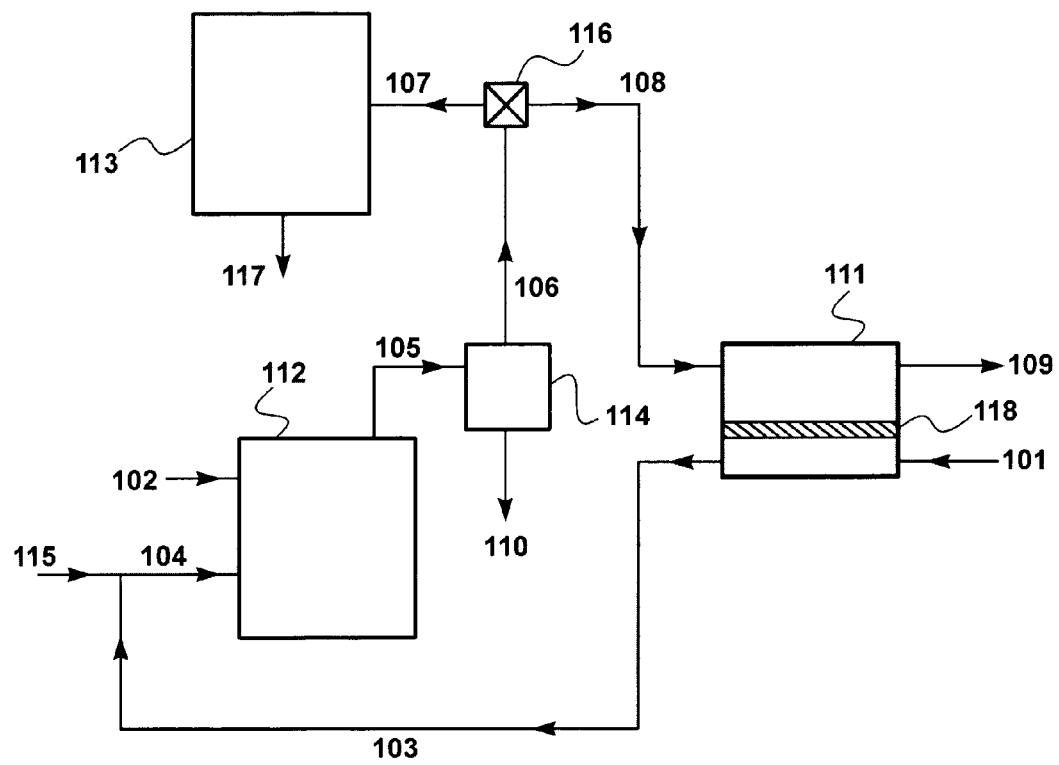
FIG. 5 is a schematic drawing of a flow scheme for an embodiment of the invention in which the carbon dioxide capture step and the sweep-based membrane separation step are performed in parallel; that is, a portion of the exhaust stream from the combustion process is routed to the carbon dioxide capture step and the other portion is routed to the sweep-based membrane separation step.

Referring to FIG. 5, fuel stream 102 and air, oxygen-enriched air, or oxygen stream 104 are introduced into combustion step or zone 112. Stream 104 is made up of sweep stream 103 (discussed below) and, optionally, additional air or oxygen supply stream 115.

The combustion step, the fuel for the combustion step, and the oxygen with which the fuel is combined are as described above with respect to the previously disclosed embodiments of the invention.

Combustion exhaust stream 105—preferably containing at least 15 vol %; more preferably, at least 20 vol %; and, most preferably, at least 25 vol %, carbon dioxide—is withdrawn. This stream usually contains at least carbon dioxide, water vapor, and nitrogen, as well as the other components mentioned in the Summary section above. Combustion exhaust stream 105 is optionally but typically routed through a condenser 114, where the stream is cooled, knocking out excess water 110. The dehydrated exhaust stream 106 is then routed through a splitter 116, where it is divided in a desired ratio into a first portion 107 and a second portion 108.

The first portion 107 of exhaust stream 106 is routed to a carbon dioxide capture step 113. The carbon dioxide capture step may be carried out using any technology or combination of technologies that can create a concentrated carbon dioxide stream from the exhaust stream. The capture step yields a concentrated carbon dioxide product stream 117 preferably containing greater than 60, 70, or 80 vol % carbon dioxide or more. This stream may be in the gas or liquid phase, or may be a supercritical fluid. The concentrated stream 117 may be sent for further processing in a sequestration step (not shown) to yield a liquid carbon dioxide product, for example, but alternatively may be used or disposed of in any other appropriate way.

The carbon dioxide capture step 113 may be carried out using membrane or non-membrane technology, and may involve one or more than one type of separation procedure. In the event that membrane technology is used in whole or part for this step, the capture step 113 remains a discrete unit operation separate from the simultaneous sweep-based membrane separation step 111.

Representative methods that may be used to capture carbon dioxide in this step include, but are not limited to, physical or chemical sorption, membrane separation, compression/low temperature condensation, adsorption, or any other known technology. Preferred technologies are absorption, such as amine scrubbing or chilled ammonia sorption, condensation, membrane separation, cryogenic condensation, and combinations of these. If membrane separation is used for the carbon dioxide capture step, it is preferred to use two or more membrane separation steps, as it is hard to reach a high carbon dioxide concentration in the permeate stream without using multiple membrane stages. Each of these methods of carbon dioxide capture is discussed in detail above, with respect to the previously disclosed embodiments of the invention, and such details are equally applicable to the present embodiments.

A second portion 108 of combustion exhaust stream 106 is sent for treatment in membrane separation step or unit 111. The membrane separation unit 111 contains membranes 118 that exhibit high permeance for carbon dioxide, as well as high selectivity for carbon dioxide over nitrogen. The separation of components achieved by the membrane unit depends not only on the selectivity of the membrane for the components to be separated, but also on the pressure ratio. Suitable membranes, membrane modules, and methods of achieving desired feed pressure/permeate pressure ratios are described in detail above with respect to the previously disclosed embodiments of the invention, and such details are equally applicable to the present embodiments.

The second portion 108 of combustion exhaust stream 106 flows across the feed side of the membranes; a sweep gas of air, oxygen-enriched air, or oxygen stream 101, flows across the permeate side. The sweep stream picks up the preferentially permeating carbon dioxide, and the resulting permeate stream 103 is withdrawn from the membrane unit and is combined with stream 115 to form the air or oxygen feed 104 to the combustor. In the alternative, stream 115 may be omitted and the entirety of the oxygen-containing feed to the combustor may be provided by the permeate stream 103.

As discussed previously, one of the additional benefits of using the combustion air or oxygen supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

The residue stream 109 resulting from the membrane sweep step 111 is reduced in carbon dioxide content to less than about 5 vol %, more preferably, to less than 3 vol %; and, most preferably, to less than 2 vol %. The residue stream 109 is discharged to the environment as treated flue gas.

The proportions of the flue gas that are directed to the carbon dioxide capture step and the sweep-based membrane separation step may be adjusted in conjunction with other operating parameters to tailor the processes of the invention to specific circumstances.

One of the goals of the process is to increase the carbon dioxide concentration in the feed stream to the carbon dioxide capture step, because many capture technologies, such as amine scrubbing and cryogenic condensation, have capital and/or operating costs that scale with the concentration of the component to be captured. The membrane separation step preferentially permeates carbon dioxide and returns it to the combustor, thereby forming a loop between the combustor and the membrane unit in which the carbon dioxide concentration can build up.

The more exhaust gas that is directed to the membrane unit, in other words, the smaller the split ratio, the greater is the potential to increase the carbon dioxide concentration in the loop. However, the amount of membrane area needed will increase in proportion to the volume flow of gas directed to the membrane unit. Furthermore, most membrane materials have slight selectivity for oxygen over nitrogen, so a little oxygen from the air sweep stream will tend to counter-permeate to the feed side of the membranes and be lost in the residue stream. In consequence, the concentration of oxygen in the combustor may drop, giving rise to the possibility of incomplete combustion, coke formation on boiler components, or other problems. As illustrated by the calculations given in the Examples section below, we have discovered that trade-offs exist between the degree of carbon dioxide enrichment that can be obtained by the membrane separation steps, the amount of oxygen lost into the residue stream, and the membrane area and compression requirements to operate the membrane separation step.

In light of these trade-offs, we believe that it is preferable to operate the process at a split ratio of between 1:10 and 3:1. A split ratio of 1:1 means that splitter, 116, divides the total flue gas flow from the combustor into two equal portions by volume, so that 50 vol % passes to the carbon dioxide capture step and 50 vol % passes to the membrane separation step. Likewise, a split ratio of 1:10 means that 9 vol % passes to the carbon dioxide capture step and 91 vol % passes to the membrane separation step, and so on. More preferably, we prefer to operate at a split ratio between 1:4 and 2:1; that is, with between 20 vol % and 65 vol % of the exhaust being directed to the carbon dioxide capture step. We have discovered that operating in this range will provide a good balance between efficiency and costs for most processes.

The choice of the optimum split ratio will depend on many case-dependent factors. For example, in certain cases, the gas may be burnt with an excess of air, so that the flue gas produced only contains 4-6 vol % carbon dioxide and 10-15 vol % oxygen. This low carbon dioxide concentration makes capture of carbon dioxide for sequestration expensive. As shown in the Examples that follow, this concentration can be increased to 30 vol % (a six-fold increase) or more by using the membrane process with a large split ratio (1:5 or even 1:10). A large split ratio implies a large membrane area (capital cost) for unit 111 in FIG. 5, but this is offset by the smaller size of the carbon dioxide capture unit 113.

In certain cases, the gas being burnt already contains some carbon dioxide, so the flue gas produced can contain 20 vol % carbon dioxide or more. In this case, although increasing the carbon dioxide concentration in the stream going to the capture process is beneficial, increasing the concentration more than two-fold begins to reach a point of diminishing returns. In this case, the split ratio will be smaller—perhaps 1:1 or 1:2—as the trade-off between the cost of the membrane unit 111 required to the cost of the carbon dioxide capture step 113 favors a low split ratio.

Figure 6:
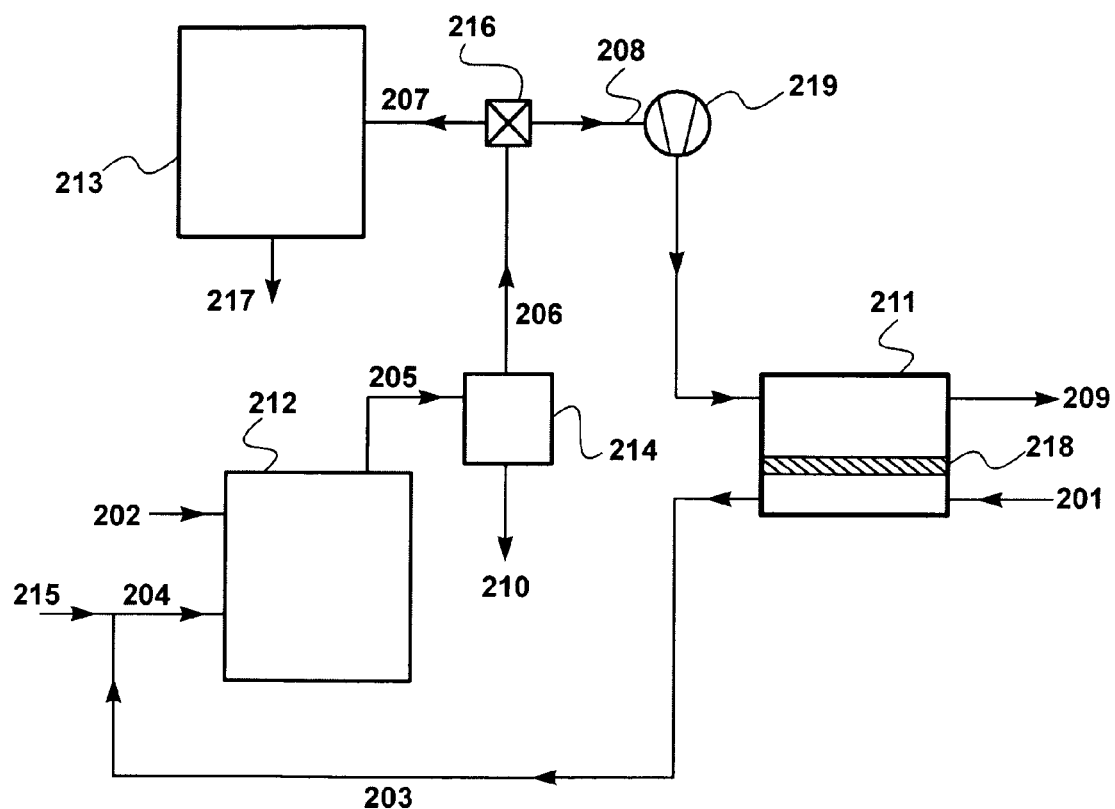
FIG. 6 is a schematic drawing of a flow scheme for an embodiment of the invention, which is a variant of the flow scheme shown in FIG. 5, in which the portion of the exhaust stream being routed to the sweep-based membrane separation step is passed through a compressor prior to being sent to the membrane separation step.

FIG. 6 is a schematic drawing of a flow scheme for an embodiment of the invention, which is a variant of the flow scheme shown in FIG. 5, in which the portion of the exhaust stream being routed to the sweep-based membrane separation step is passed through a compressor prior to being sent to the membrane separation step. Such embodiments are preferred in situations where the energy costs of the compression step can be tolerated, such as when energy can be recovered in a turbo-expander, as discussed with respect to the series embodiments of the invention above.

Referring to FIG. 6, fuel stream 202 and air, oxygen-enriched air, or oxygen stream 204 are introduced into combustion step or zone 212. Stream 204 is made up of sweep stream 203 and, optionally, additional air or oxygen supply stream 215.

Combustion exhaust stream 205—preferably containing at least 15 vol %; more preferably, at least 20 vol %; and, most preferably, at least 25 vol %, carbon dioxide—is withdrawn. Combustion exhaust stream 205 is typically routed through a condenser 214, where water 210 is knocked out of the stream. The dehydrated exhaust stream 206 is then routed through splitter 216, where it is divided in a desired ratio into first portion 207 and second portion 208.

The first portion 207 of exhaust stream 206 is routed to carbon dioxide capture step 213, which yields a concentrated carbon dioxide product stream 217.

The second portion 208 of combustion exhaust stream 206 is then routed through a compressor 219, where it is compressed to a pressure of up to about 5 bar—such as 2 bar—prior to being sent for treatment in membrane separation step or unit 211, which contains membranes 218 that exhibit high permeance for carbon dioxide, as well as high selectivity for carbon dioxide over nitrogen. The second portion 208 of combustion exhaust stream 206 flows across the feed side of the membranes; a sweep gas of air, oxygen-enriched air, or oxygen stream 201, flows across the permeate side. The sweep stream picks up the preferentially permeating carbon dioxide, and the resulting permeate stream 203 is withdrawn from the membrane unit and is combined with stream 215 to form the air or oxygen feed 204 to the combustor. In the alternative, stream 215 may be omitted and the entirety of the oxygen-containing feed to the combustor may be provided by the permeate stream 203.

The residue stream 209 resulting from the membrane sweep step, which is discharged to the environment as treated flue gas, is reduced in carbon dioxide content to less than about 5 vol %, more preferably, to less than 4 vol %; and, most preferably, to less than 3 vol %.

Figure 7:
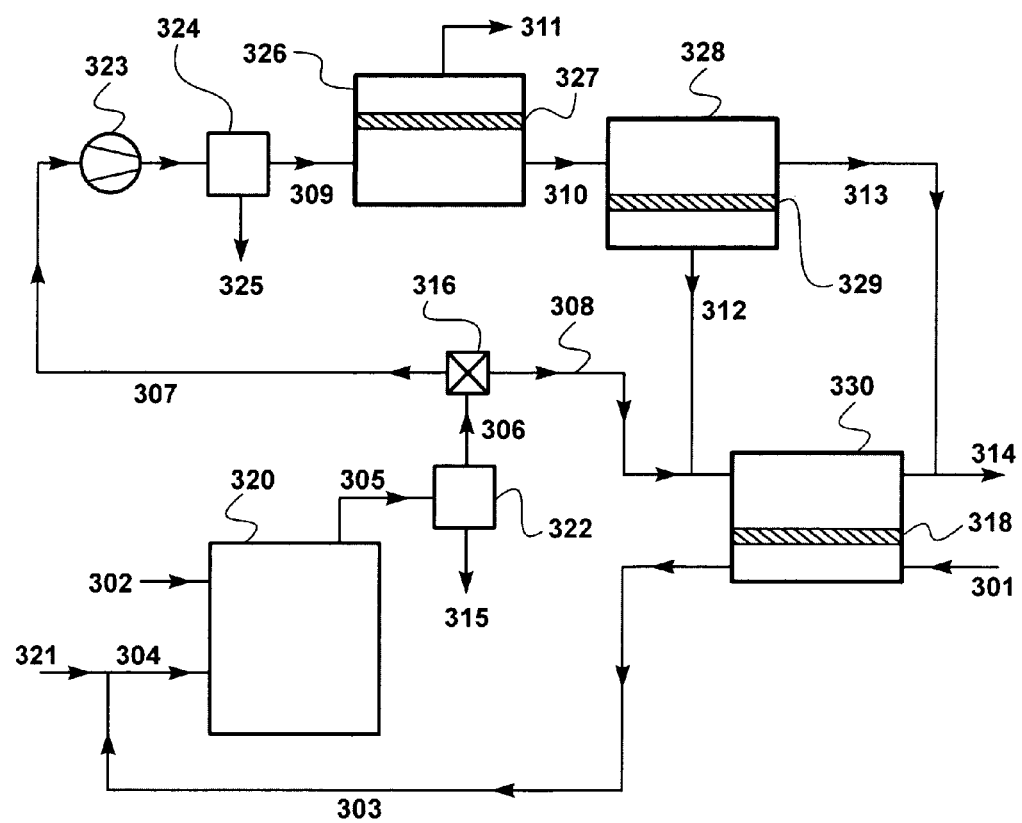
FIG. 7 is a schematic drawing of a flow scheme for an embodiment of the invention, which is a variant of the flow scheme shown in FIG. 5, in which the carbon dioxide capture step comprises two membrane-based capture steps.

FIG. 7 is a schematic drawing of a flow scheme for an embodiment of the invention, which is a variant of the flow scheme shown in FIG. 5, in which the carbon dioxide capture step comprises two membrane-based capture steps.

Referring to FIG. 7, fuel stream 302 and air, oxygen-enriched air, or oxygen stream 304 are introduced into combustion step or zone 320. Stream 304 is made up of sweep stream 303 and, optionally, additional air or oxygen supply stream 321.

Combustion exhaust stream 305—preferably containing at least 15 vol %; more preferably, at least 20 vol %; and, most preferably, at least 25 vol %, carbon dioxide—is withdrawn. Combustion exhaust stream 305 is typically routed through a condenser 322, where water 315 is knocked out of the stream. The dehydrated exhaust stream 306 is then routed through splitter 316, where it is divided in a desired ratio into first portion 307 and second portion 308.

The first portion 307 of exhaust stream 306 is then routed through a compressor 323, where it is compressed to a pressure of up to about 5 bar, followed by a condenser 324, where water 325 is knocked out of the stream. The dehydrated stream 309 is routed to a carbon dioxide capture process, which in this embodiment comprises two membrane-based capture steps, 326 and 328. The membrane units 326 and 328 contain membranes 327 and 329, respectively, that exhibit high permeance for carbon dioxide, as well as high selectivity for carbon dioxide over nitrogen.

The permeate stream 311 from the first membrane unit 326 yields a high-purity carbon dioxide product. The residue stream 310 from the first membrane unit 326 is routed to second membrane unit 328 to remove carbon dioxide remaining in the first residue stream before the stream is discharged. The permeate stream 312 from the second membrane unit 328 is passed to the sweep-based membrane separation step 330. The carbon-dioxide depleted residue stream 313 is typically exhausted to the environment.

The second portion 308 of combustion exhaust stream 306 and the permeate stream 312 from the second membrane-based capture step 328 are then sent for treatment in membrane separation step or unit 330, which contains membranes 318 that exhibit high permeance for carbon dioxide, as well as high selectivity for carbon dioxide over nitrogen. The second portion 308 of combustion exhaust stream 306 and the permeate stream 312 from the second membrane-based capture step 328 flow across the feed side of the membranes; a sweep gas of air, oxygen-enriched air, or oxygen stream 301, flows across the permeate side. The sweep stream picks up the preferentially permeating carbon dioxide, and the resulting permeate stream 303 is withdrawn from the membrane unit and is combined with stream 321 to form the air or oxygen feed 304 to the combustor. In the alternative, stream 321 may be omitted and the entirety of the oxygen-containing feed to the combustor may be provided by the permeate stream 303.

The residue stream 314 resulting from the membrane sweep step, which is discharged to the environment as treated flue gas, is reduced in carbon dioxide content to less than about 5 vol %, more preferably, to less than 4 vol %; and, most preferably, to less than 3 vol %.

The invention is now further described by the following examples, which are intended to be illustrative of the invention, but are not intended to limit the scope or underlying principles in any way.

EXAMPLES

Example 1

Bases of Calculations for Other Examples (a) Membrane permeation experiments: Sets of permeation experiments were performed with two different composite membranes, each having a polyether-based selective layer. The properties of the membranes as measured with a set of pure gases at 6.7 bar absolute and 30° C. are shown in Tables 1 and 2.

TABLE 1

| Gas | Permeance (gpu)* | $CO_2$/Gas Selectivity |
|---|---|---|
| Carbon dioxide | 1,000 | — |
| Nitrogen | 20 | 50 |
| Oxygen | 50 | 20 |
| Methane | 50 | 20 |
| Water | >2,000** | — |

*Gas permeation unit; 1 gpu = $1 \times 10^{-6}$ cm$^3$(STP)/cm$^2 \cdot$ s $\cdot$ cmHg
**Estimated, not measured The following calculations were performed using the membrane properties shown in Table 2.

TABLE 2

| Gas | Permeance (gpu)* | $CO_2$/Gas Selectivity |
|---|---|---|
| Carbon dioxide | 1,000 | — |
| Nitrogen | 30 | 33 |
| Oxygen | 60 | 17 |
| Hydrogen | 100 | 10 |
| Water | 5,000** | — |

*Gas permeation unit; 1 gpu = $1 \times 10^{-6}$ cm$^3$(STP)/cm$^2 \cdot$ s $\cdot$ cmHg
**Estimated, not measured (b) Calculation methodology: The computer calculations in all of the following Examples were performed using a modeling program, ChemCad 5.6 (ChemStations, Inc., Houston, Tex.) containing code developed by assignee's engineering group for applications specific to assignee's processes. For the calculations, all compressors and vacuum pumps were assumed to be 75% efficient. In each case, the modeling calculation was performed to achieve about 80-90% recovery of carbon dioxide from the flue gas stream.

(c) "No membrane" example: A computer calculation was performed to determine the chemical composition of untreated flue gas from a coal combustion process. The calculation was performed assuming that the flue gas to be treated was from a 500 MW gross power coal-fired power plant. It was assumed that the exhaust gas is filtered to remove particulate matter before passing to the membrane separation steps.

Figure 8:
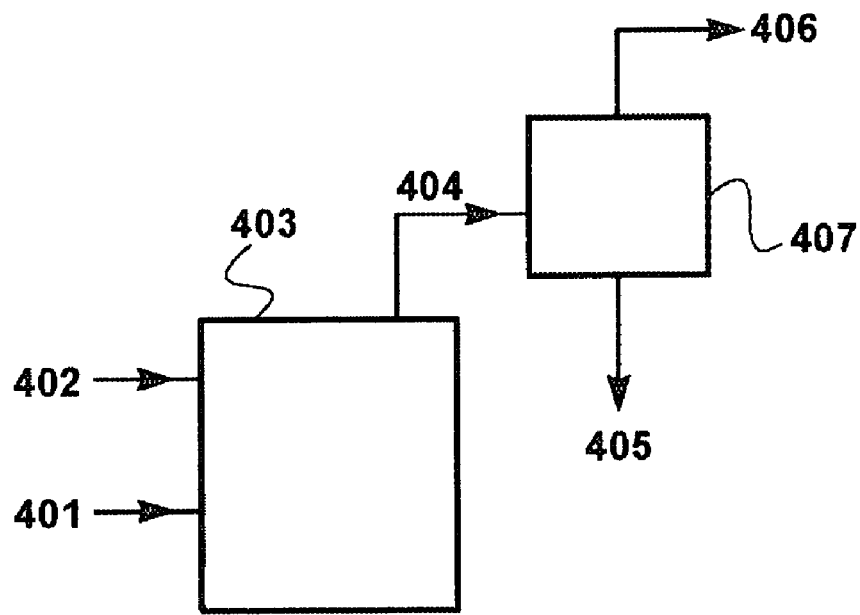
FIG. 8 is a schematic drawing of a flow scheme for a combustion process that does not include a sweep-based membrane separation step (not in accordance with the invention).

FIG. 8 is a schematic drawing of a flow scheme for a combustion process that does not include a sweep-based membrane separation step. Fuel stream 402 and air stream 401 are introduced into combustion step or zone 403. (The combustion step, the fuel for the combustion step, and the oxygen with which the fuel is combined are as described in the Detailed Description, above.)

Combustion exhaust stream 404 is withdrawn, then routed through a cooler/condenser 407, where water 405 is knocked out of the stream. The chemical composition of the resulting untreated flue gas stream 406 was then calculated. The results of this calculation are shown in Table 3.

TABLE 3

| Parameter/Stream | Coal (402) | Air Stream (401) | Condenser Knockout (405) | Flue Gas (406) |
|---|---|---|---|---|
| Total Flow (kg/h) | 132,000 | 2,280,000 | 62,160 | 2,349,600 |
| Temperature (° C.) | 25 | 25 | 40 | 40 |
| Pressure (bar) | 1.0 | 1.0 | 1.0 | 1.0 |
| Component (vol %) | | | | |
| Coal (carbon + hydrogen) | 100.0 | 0 | 0 | 0 |
| Oxygen | 0 | 21.0 | 0 | 3.1 |
| Nitrogen | 0 | 79.0 | 0 | 77.8 |
| Carbon Dioxide | 0 | 0 | 0 | 11.7 |
| Water | 0 | 0 | 100 | 7.4 |

After the water vapor in the stream is condensed, the carbon dioxide concentration in the combustion exhaust stream is 11.7 vol %. Discharge of such a stream in its untreated form would release 10,000 tons of carbon dioxide into the atmosphere per day. On the other hand, the carbon dioxide concentration is too low to enable the stream to be treated economically by traditional means, such as absorption or low-temperature condensation.

Examples 2-8

Processes of the Invention: Modeling of Sweep-based Membrane Separation Step and Effect on Combustion Step A set of calculations was performed to model the effect of various process parameters on the performance of the sweep-based membrane separation step and its effect on the combustion step. The calculations for Examples 2 through 8 were performed using the flow scheme shown in FIG. 5 and described in the Detailed Description, above. This flow scheme includes a sweep-based membrane separation step, 111.

To facilitate operation of the calculation software, the base case air flow provided to the combustor via the membrane permeate side was assumed to be about 740 m$^3$/h (950 kg/h), compared with the typical air flow to a 500 MW power plant of about 1.8 million m$^3$/h used for the calculation of Example 1. In other words, the scale of the calculations for Examples 2 through 8 was about 1/2,400 of the scale for a typical coal-fired power plant. This reduces membrane area proportionately, but does not affect the relative flow rates or compositions of the streams involved.

Example 2

Process of the Invention

In this example, the membrane area was assumed to be 400 m$^2$, and the combustion exhaust stream split ratio was set at 1:1 (flow to carbon dioxide capture step:flow to sweep-based membrane separation step). The separation was assumed to be performed using a membrane having permeation properties as in Table 2. The results of this calculation are shown in Table 4.

Compared with the "no membrane" Example 1, the carbon dioxide content in the combustion exhaust stream 107 sent to the capture step is increased from 11.7 vol % to 19.2 vol %, and compared to Example 1, the volume of gas to be treated by the carbon dioxide capture step 113 is reduced almost in half. This reduction in gas volume and increase in carbon dioxide concentration reduces the cost of carbon dioxide capture by essentially all capture technologies. This reduction in cost can then bring carbon dioxide capture from coal-fired power plants and other large carbon dioxide combustion gas streams into an economically acceptable range.

The carbon dioxide concentration in the membrane residue stream is reduced to 2.9 vol %, and venting of this stream to the atmosphere would release about 1,000 tons of carbon dioxide per day from a 500 MW power plant. Comparing this Example with Example 1, it can be seen that the process is effective in capturing 90% of the carbon dioxide emitted from the combustion section of the power plant.

As can also be seen, however, use of the incoming air as the permeate sweep stream reduces the oxygen content in the air to the combustor from the normal 21 vol % to 17.5 vol %. As a result, the mass flow of oxygen to the combustor is reduced from 221 kg/h in the conventional, no membrane case to 207 kg/h, and the oxygen content of the combustion exhaust stream, 108, is reduced to 1.6 vol %. The low exhaust oxygen concentration indicates that a real combustion process might be compromised under these conditions, and that insufficient oxygen mass flow would be available to achieve complete combustion without modifying the combustor. This is, therefore, a workable but less preferred process configuration.

Example 3

Process of the Invention with Increased Air Flow

In this set of calculations, the air flow to the process via the permeate sweep stream was increased incrementally, until the oxygen mass flow to the combustor was comparable with that of Example 1, and the calculation showed an oxygen content of 3 vol % in the combustor exhaust stream. All other oper-

TABLE 4

| | Stream | | | | | | |
|---|---|---|---|---|---|---|---|
| Parameter | Coal (102) | Condenser Knockout (110) | Gas to Capture Step (107) | Membrane Feed (108) | Air Sweep (101) | Gas to Combustor (103) | Retentate (109) |
| Total Flow (kg/h) | 55 | 46 | 554 | 554 | 950 | 1100 | 404 |
| Temperature (° C.) | 25 | 40 | 40 | 40 | 25 | 33 | 25 |
| Pressure(bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 17.5 | 5.2 |
| Nitrogen | 0 | 0 | 71.8 | 71.8 | 79.0 | 70.6 | 91.9 |
| Carbon Dioxide | 0 | 0 | 19.2 | 19.2 | 0 | 8.3 | 2.9 |
| Water | 0 | 100 | 7.4 | 7.4 | 0 | 3.6 | 0 | ating parameters, including split ratio and membrane area, were the same as in Example 2. The results of the calculation are shown in Table 5.

TABLE 5

| Parameter | Stream | | | | | | |
|---|---|---|---|---|---|---|---|
| | Coal (102) | Condenser Knockout (110) | Gas to Capture Step (107) | Membrane Feed (108) | Air Sweep (101) | Gas to Combustor (103) | Retentate (109) |
| Total Flow (kg/h) | 55 | 44 | 596 | 596 | 1035 | 1182 | 450 |
| Temperature (° C.) | 25 | 40 | 40 | 40 | 25 | 33 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 3.2 | 3.2 | 21.0 | 17.8 | 6.6 |
| Nitrogen | 0 | 0 | 72.0 | 72.0 | 79.0 | 71.1 | 90.3 |
| Carbon Dioxide | 0 | 0 | 17.4 | 17.4 | 0 | 7.4 | 3.1 |
| Water | 0 | 100 | 7.4 | 7.4 | 0 | 3.7 | 0 |

Although the oxygen content of the combustion exhaust stream 108 is increased to 3.2 vol %, the carbon dioxide content of the combustion exhaust stream, 108, was lower than in Example 2, at 17.4 vol %, and the carbon dioxide content of the treated flue gas, 109, was a little higher, at 3.1 vol %.

Example 4

Process of the Invention with Split Ratio 1:2

In this set of calculations, the split ratio was changed to 1:2, that is, two volumes of exhaust gas were assumed to be sent to the membrane separation step for every volume of exhaust gas sent to the carbon dioxide capture step. The membrane area was again assumed to be 400 m², and the air flow rate in stream 101 was assumed to be the base calculation value of 950 kg/h. The results of the calculation are shown in Table 6.

the concentration of carbon dioxide compared with Example 1. Thus, use of the sweep-based membrane separation step in parallel with the carbon dioxide capture step could unload the carbon dioxide capture step proportionately; however, the oxygen content of the combustion exhaust stream, 108, has dropped to an undesirably low value (1.6 vol %) and the carbon dioxide content of the treated flue gas is relatively high (6.5 vol %).

Example 5

Process of the Invention with Increased Membrane Area

To compensate for the adverse aspects of decreasing the split ratio as in Example 4, the membrane area was assumed to be doubled, to 800 m². As in Example 3, a set of calculations was performed, increasing the air intake incrementally to the process to bring the oxygen concentration of the flue gas stream from the combustor back to 3 vol % and the mass flow back to about 42 kg/h. This required the intake flow rate

TABLE 6

| Parameter | Stream | | | | | | |
|---|---|---|---|---|---|---|---|
| | Coal (102) | Condenser Knockout (110) | Gas to Capture Step (107) | Membrane Feed (108) | Air Sweep (101) | Gas to Combustor (103) | Retentate (109) |
| Total Flow (kg/h) | 55 | 54 | 384 | 768 | 950 | 1151 | 567 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100.0 | 0 | 0 | 0 | 0 | 0 | 0 |
| Oxygen | 0 | 0 | 1.6 | 1.6 | 21.0 | 16.8 | 4.3 |
| Nitrogen | 0 | 0 | 69.7 | 69.7 | 79.0 | 67.8 | 89.2 |
| Carbon Dioxide | 0 | 0 | 21.3 | 21.3 | 0 | 10.6 | 6.4 |
| Water | 0 | 100 | 7.4 | 7.4 | 0 | 4.8 | 0.1 |

Increasing the relative volume of exhaust gas being treated in the membrane separation step results in a substantial increase in the concentration of carbon dioxide in the exhaust gas from the combustor. The exhaust gas has almost double of air to be increased from 950 kg/h to 1,090 kg/h. All other operating parameters, including split ratio, were the same as in Example 4. The results of the calculation are shown in Table 7.

TABLE 7

| Parameter | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 51 | 456 | 912 | 1090 | 1364 | 638.1 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 16.0 | 7.3 |
| Nitrogen | 0 | 0 | 67.8 | 67.8 | 79.0 | 66.5 | 89.6 |
| Carbon Dioxide | 0 | 0 | 21.8 | 21.8 | 0 | 12.7 | 3.1 |
| Water | 0 | 100 | 7.4 | 7.4 | 0 | 4.8 | 0 |

Compared to Example 4, the carbon dioxide content of the combustion exhaust stream, 108, remained high (21.8 vol %). The oxygen content of the combustion exhaust stream, 108, was raised to almost 3 vol %, and the carbon dioxide content of the treated flue gas, 109, was reduced to a much lower level of 3.1 vol %. The process achieves about 82% recovery of carbon dioxide.

Example 6

Process of the Invention with Split Ratio 1:4

In this example, the split ratio was changed to 1:4; that is, four volumes of exhaust gas were assumed to be sent to the membrane separation step for every volume of exhaust gas sent to the carbon dioxide capture step. The membrane area was again assumed to be 400 m$^2$, and the air flow rate in stream 101 was assumed to be the base case calculation value of 950 kg/h. The results of the calculation are shown in Table 8.

Increasing the relative volume of exhaust gas being treated in the membrane separation step results in a further increase in the carbon dioxide content of the combustion exhaust stream, 108, to 22.5 vol %; however, the oxygen content of the combustion exhaust stream, 108, is low (1.6 vol %) and the carbon dioxide content of the treated flue gas, 109, is high (9.1 vol %).

Example 7

Process of the Invention

As with Example 5, the membrane area and air intake were assumed to be increased to balance the less desirable effects of decreasing the split ratio. In this example the membrane area was assumed to be increased to 1,600 m$^2$, and the air flow, 101, was assumed to be increased to 1,200 kg/h. Other parameters are as in Example 6, including a split ratio of 1:4. The results of the calculation are shown in Table 9.

TABLE 8

| Parameter | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 59 | 236 | 942 | 950 | 1182 | 710 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 16.4 | 3.8 |
| Nitrogen | 0 | 0 | 68.5 | 68.5 | 79.0 | 66.3 | 86.8 |
| Carbon Dioxide | 0 | 0 | 22.5 | 22.5 | 0 | 11.8 | 9.1 |
| Water | 0 | 100 | 7.4 | 7.4 | 0 | 5.5 | 0.3 |

TABLE 9

| Parameter | Coal (102) | Condenser Knockout (110) | Gas to Capture Step (107) | Membrane Feed (108) | Air Sweep (101) | Gas to Combustor (103) | Retentate (109) |
|---|---|---|---|---|---|---|---|
| Total Flow (kg/h) | 55 | 56 | 340 | 1361 | 1200 | 1702 | 859 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 13.6 | 8.5 |
| Nitrogen | 0 | 0 | 62.0 | 62.0 | 79.0 | 60.8 | 88.1 |
| Carbon Dioxide | 0 | 0 | 27.7 | 27.7 | 0 | 19.9 | 3.3 |
| Water | 0 | 100 | 7.4 | 7.4 | 0 | 5.7 | 0.1 |

The combination of the lowered split ratio, increased membrane area, and increased air flow rate resulted in an increase of the carbon dioxide content of the combustion exhaust stream to 27.7 vol %. The oxygen content of the combustion exhaust stream, 108, was about 3 vol %, and the carbon dioxide content of the treated flue gas was lowered to 3.3 vol %. The process achieves about 75% carbon dioxide recovery.

Example 8

Process of the Invention with Addition of Oxygen

The process of the invention was assumed to be carried out as in Example 7. The only difference was that the air intake via the permeate sweep line was assumed to be at the base case flow rate value of 950 kg/h, and an additional 50 kg/h of pure oxygen was assumed to be introduced directly into the combustor as stream 115. The results of the calculation are shown in Table 10.

With addition of make-up oxygen, the carbon dioxide content of the combustion exhaust stream, 108, is increased to 33.5 vol %. The oxygen content of the combustion exhaust stream, 108, is 3.0 vol %, and the carbon dioxide content of the treated flue gas, 109, is 3.3 vol %. The process achieves about 80% carbon dioxide recovery.

Example 9-10

Process of the Invention with Compression of Membrane Feed Stream

The calculations for Examples 9 and 10 were performed using the flow scheme shown in FIG. 6 and described in the Detailed Description, above. The flow scheme shown in FIG. 6 is a variant of the flow scheme shown in FIG. 5, in which the portion of the exhaust stream, 208, being routed to the sweep-

TABLE 10

| Parameter | Coal (102) | O$_2$ (101) | Condenser Knockout (110) | Gas to Capture Step (107) | Membrane Feed (108) | Air Sweep (101) | Gas to Combustor (103) | Retentate (109) |
|---|---|---|---|---|---|---|---|---|
| Total Flow (kg/h) | 55 | 50 | 58 | 306 | 1225 | 950 | 1485 | 690.4 |
| Temperature (° C.) | 25 | 25 | 40 | 40 | 40 | 25 | 37 | 25 |
| Pressure (bar) | 1.0 | 1.0 | 1.0 | 1.0 | 1.0 | 1.0 | 1.0 | 1.0 |
| Component (vol %) | | | | | | | | |
| Coal (carbon + hydrogen) | 100 | 0 | 0 | 0 | 0 | 0 | 0 | 0 |
| Oxygen | 0 | 100 | 0 | 3.0 | 3.0 | 21.0 | 12.4 | 9.7 |
| Nitrogen | 0 | 0 | 0 | 56.1 | 56.1 | 79.0 | 56.4 | 87.0 |
| Carbon Dioxide | 0 | 0 | 0 | 33.5 | 33.5 | 0 | 25.2 | 3.3 |
| Water | 0 | 0 | 100 | 7.4 | 7.4 | 0 | 6.0 | 0 | based membrane separation step, 211, is passed through a compressor, 219, prior to being sent to the membrane separation step, 211.

Example 9

Process of the Invention with Split Ratio 1:4

A calculation was performed using the results of Example 7 as basis, and again assuming a split ratio of 1:4. Iterative calculations showed that use of feed compression to 2 bar enables the membrane area to be reduced to 500 m², and the air flow, 201, to be reduced to 1050 kg/h. The results of the calculation are shown in Table 11.

Example 10

Process of the Invention with Split Ratio 1:9

This Example illustrates the combined effect of slight compression and a low split ratio of 1:9. The calculation was performed assuming a membrane area of 600 m², and an intake air flow rate in stream 201 of 1,150 kg/h. The assumption for membrane area and air intake flow rate are higher than for Example 9, to balance the lower split ratio. The results of the calculation are shown in Table 12.

TABLE 11

| | Stream | | | | | | |
|---|---|---|---|---|---|---|---|
| Parameter | Coal (202) | Condenser Knockout (210) | Gas to Capture Step (207) | Membrane Feed (208) | Air Sweep (201) | Gas to Combustor (203) | Retentate (209) |
| Total Flow (kg/h) | 55 | 63 | 327 | 1309 | 1050 | 1644 | 715 |
| Temperature (° C.) | 25 | 30 | 30 | 45 | 25 | 40 | 25 |
| Pressure (bar) | 1.0 | 1.0 | 1.0 | 2.0 | 1.0 | 1.0 | 2.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 14.3 | 5.9 |
| Nitrogen | 0 | 0 | 60.7 | 60.7 | 79.0 | 58.9 | 91.2 |
| Carbon Dioxide | 0 | 0 | 32.1 | 32.1 | 0 | 23.5 | 2.9 |
| Water | 0 | 100 | 4.3 | 4.3 | 0 | 3.3 | 0 |

The carbon dioxide content of the combustion exhaust stream, 208, is 32.1 vol %. The oxygen content of the combustion exhaust stream, 208, is just under 3 vol %, and the carbon dioxide content of the treated flue gas, 209, is 2.9 vol %. Recovery of carbon dioxide is about 85%.

TABLE 12

| | Stream | | | | | | |
|---|---|---|---|---|---|---|---|
| Parameter | Coal (202) | Condenser Knockout (210) | Gas to Capture Step (207) | Membrane Feed (208) | Air Sweep (201) | Gas to Combustor (203) | Retentate (209) |
| Total Flow (kg/h) | 55 | 65 | 232 | 2085 | 1150 | 2327 | 909 |
| Temperature (° C.) | 25 | 30 | 30 | 45 | 25 | 43 | 25 |
| Pressure (bar) | 1.0 | 1.0 | 1.0 | 2.0 | 1.0 | 1.0 | 2.0 |
| Component (vol %) | | | | | | | |
| Coal (carbon + hydrogen) | 100 | 0 | 0 | 0 | 0 | 0 | 0 |
| Oxygen | 0 | 0 | 3.2 | 3.2 | 21.0 | 11.7 | 7.2 |
| Nitrogen | 0 | 0 | 50.1 | 50.1 | 79.0 | 48.9 | 89.3 |
| Carbon Dioxide | 0 | 0 | 42.4 | 42.4 | 0 | 35.7 | 3.5 |
| Water | 0 | 100 | 4.3 | 4.3 | 0 | 3.7 | 0 |

The carbon dioxide content of the combustion exhaust stream, 208, is increased to 42.4 vol %. The oxygen content of the combustion exhaust stream, 208, is 3.2 vol %, and the carbon dioxide content of the treated flue gas, 209, is 3.5 vol %. The recovery of carbon dioxide in this case drops to about 65%, but the very high carbon dioxide content in the feed stream to the carbon dioxide capture step provides a large benefit in terms of de-bottlenecking or reducing required capacity and operating costs for this step.

Examples 11 and 12

Processes of the Invention using Membrane Separation for the Carbon Dioxide Capture Step The calculations for Examples 16 and 17 were performed using the flow scheme shown in FIG. 7 and described in the Detailed Description, above. The flow scheme shown in FIG. 7 is a variant of the flow scheme shown in FIG. 5, in which the carbon dioxide capture step comprises two membrane-based capture steps, 326 and 328.

Example 11

Process of the Invention with Compression

This Example was calculated assuming approximately the same parameters as in Example 7; that is, a split ratio of 1:4, an air flow rate of 1,200 kg/h, and a membrane area for the sweep-based membrane step of 1,600 m². The membrane areas for the two membrane-based capture steps, 326 and 328, were assumed to be 22 m² and 20 m², respectively. The results of the calculation are shown in Table 13.

bon membrane capture step, 326, yields a concentrated carbon dioxide product, 311, containing 77.3 vol % carbon dioxide.

The feed stream, 310, from first membrane unit, 326, is routed to second membrane unit, 328, to recover more of the carbon dioxide from the stream. The permeate stream, 312, from the second membrane unit, 328, contains 36.0 vol % carbon dioxide, and is passed to the sweep-based membrane separation step, 330. The carbon-dioxide depleted feed stream, 313, from the second carbon dioxide capture step, 328, contains 3.0 vol % carbon dioxide. This stream is combined with the exhaust stream, 314, from the sweep-based membrane separation step, 330, which contains 3.8 vol % carbon dioxide, and is vented to the environment. Carbon dioxide is lost in both streams 313 and 314, so the recover of carbon dioxide is comparatively low, at about 65%.

Example 12

Process of the Invention with Addition of Pure Oxygen

The calculations of Example 11 were repeated, but this time it was assumed that a make-up stream of 50 kg/h of pure oxygen was added directly to the combustor, as in Example 8, so that the air intake via the permeate sweep line was reduced to the base case flow rate value of 950 kg/h. As in Example 11, the split ratio was assumed to be 1:4, and the membrane area for the sweep-based membrane separation step was assumed to be 1600 m². The membrane areas for the two membrane-based capture steps, 326 and 328, were assumed to be 20 m²

TABLE 13

| Parameter | Stream | | | | | | | | |
|---|---|---|---|---|---|---|---|---|---|
| | Coal (302) | Condenser Overhead (308) | Feed to CO2 Capture (309) | CO2-vent (311) | CO2-rich (312) | CO2-lean (313) | Air Sweep (301) | Gas to Combustor (303) | Retentate (314) |
| Total Flow (kg/h) | 55 | 1364 | 334 | 134 | 35 | 165 | 1200 | 1712 | 886.3 |
| Temp. (° C.) | 25 | 30 | 40 | 39 | 37 | 37 | 25 | 29 | 25 |
| Pressure (bar) | 1.0 | 1.0 | 10.0 | 1.0 | 1.0 | 10.0 | 1.0 | 1.0 | 1.0 |
| Component (vol %) | | | | | | | | | |
| Coal (carbon + hydrogen) | 100 | 0 | 0 | 0 | 0 | 0 | 0 | 0 | 0 |
| Oxygen | 0 | 3.0 | 3.1 | 1.6 | 4.5 | 3.6 | 21.0 | 13.8 | 8.5 |
| Nitrogen | 0 | 63.1 | 65.4 | 18.8 | 59.2 | 93.4 | 79.0 | 61.3 | 87.7 |
| Carbon Dioxide | 0 | 30.0 | 30.8 | 77.3 | 36.0 | 3.0 | 0 | 21.6 | 3.8 |
| Water | 0 | 4.3 | 0.7 | 2.3 | 0.3 | 0.1 | 0 | 3.3 | 0 |

The feed gas, 309, to the two-step carbon dioxide capture process consists of 30.8 vol % carbon dioxide. The first carand 15 m², respectively. The results of the calculation are shown in Table 14.

TABLE 14

| Parameter | Stream | | | | | | | | | |
|---|---|---|---|---|---|---|---|---|---|---|
| | Coal (302) | O2 (301) | Condenser Overhead (308) | Feed to CO2 Capture (309) | CO2-vent (311) | CO2-rich (312) | CO2-lean (313) | Air Sweep (301) | Gas to Combustor (303) | Retentate (214) |
| Total Flow (kg/h) | 55 | 50 | 1227 | 301 | 143 | 28 | 130 | 950 | 1492 | 712 |
| Temp. (° C.) | 25 | 25 | 30 | 40 | 38 | 36 | 36 | 25 | 29 | 25 |
| Pressure (bar) | 1.0 | 1.0 | 1.0 | 10.0 | 1.0 | 1.0 | 10.0 | 1.0 | 1.0 | 1.0 |
| Component (vol %) | | | | | | | | | | |
| Coal (carbon + hydrogen) | 100 | 0 | 0 | 0 | 0 | 0 | 0 | 0 | 0 | 0 |

TABLE 14-continued

| Parameter | Stream | | | | | | | | |
|---|---|---|---|---|---|---|---|---|---|
| | Coal (302) | O2 (301) | Condenser Overhead (308) | Feed to CO2 Capture (309) | CO2-vent (311) | CO2-rich (312) | CO2-lean (313) | Air Sweep (301) | Gas to Combustor (303) | Retentate (214) |
| Oxygen | 0 | 100 | 3.1 | 3.2 | 1.6 | 5.2 | 4.1 | 21.0 | 12.5 | 9.6 |
| Nitrogen | 0 | 0 | 57.1 | 59.2 | 15.7 | 58.7 | 92.9 | 79.0 | 57.1 | 86.5 |
| Carbon Dioxide | 0 | 0 | 35.5 | 36.8 | 80.8 | 36.0 | 3.0 | 0 | 27.0 | 3.9 |
| Water | 0 | 0 | 4.3 | 0.8 | 1.9 | 0.1 | 0 | 0 | 3.4 | 0 |

The feed gas, 309, to the two-step carbon dioxide capture process consists of 36.8 vol % carbon dioxide. The first carbon dioxide capture step, 326, yields a concentrated carbon dioxide product, 311, containing 80.8 vol % carbon dioxide. The feed stream, 310, from the first membrane unit, 326, is routed to second membrane unit, 328, to recover more of the carbon dioxide from the stream. The permeate stream, 312, from the second membrane unit, 328, contains 36.0 vol % carbon dioxide, which is then passed to the sweep-based membrane separation step, 330. The carbon-dioxide depleted feed stream, 313, from the second carbon dioxide capture step, 328, contains 3.0 vol % carbon dioxide. This stream is combined with the exhaust stream, 314, from the sweep-based membrane separation step, 330, and is routed to the environment with a carbon dioxide content of 3.9 vol %. The recovery of carbon dioxide is increased to 75% compared with 65% in Example 11.

These calculations show that a number of variants to the basic design of the process are possible. These changes to the process design and operating conditions will change the concentration of carbon dioxide in, the stream sent to the carbon dioxide capture step and the overall recovery of carbon dioxide in the step. A trade-off exists between high carbon dioxide capture and high carbon dioxide concentration with the amount of membrane area in the sweep unit and other variable, such as the amount of compression used. The optimum conditions and design will depend on the goals of the plant operator and the cost of the membrane, compression, and so on.

We claim:

1. A process for controlling carbon dioxide exhaust from a combustion process, comprising:
   (a) performing a combustion process by combusting a mixture of a fuel and air, oxygen-enriched air, or oxygen, thereby creating an exhaust stream comprising carbon dioxide and nitrogen;
   (b) performing a carbon dioxide capture step to remove a portion of carbon dioxide in concentrated form from a first portion of the exhaust stream, thereby creating an off-gas stream from the capture step that is less concentrated in carbon dioxide than the exhaust stream;
   (c) providing a membrane having a feed side and a permeate side, and being selectively permeable to carbon dioxide over nitrogen and to carbon dioxide over oxygen;
   (d) passing a second portion of the exhaust stream across the feed side;
   (e) passing air, oxygen-enriched air, or oxygen as a sweep stream across the permeate side;
   (f) withdrawing from the feed side a carbon-dioxide depleted vent stream;
   (g) withdrawing from the permeate side a permeate stream comprising oxygen and carbon dioxide;
   (h) passing the permeate stream to step (a) as at least part of the air, oxygen-enriched air, or oxygen used in step (a).

2. The process of claim 1, wherein the exhaust stream comprises flue gas from a coal-fired power plant.

3. The process of claim 1, wherein the exhaust stream comprises at least 15 vol % $CO_2$.

4. The process of claim 3, wherein the exhaust stream comprises at least 20 vol % $CO_2$.

5. The process of claim 4, wherein the exhaust stream comprises at least 25 vol % $CO_2$.

6. The process of claim 1, wherein the exhaust stream comprises at least 3 vol % oxygen.

7. The process of claim 1, wherein the first portion of the exhaust stream comprises between about 10 vol % and about 75 vol % of the exhaust stream.

8. The process of claim 7, wherein the first portion of the exhaust stream comprises between about 20 vol % and about 65 vol % of the exhaust stream.

9. The process of claim 8, wherein the first portion of the exhaust stream comprises between about 40 vol % and about 60 vol % of the exhaust stream.

10. The process of claim 1, wherein the carbon dioxide capture step comprises at least one process selected from the group consisting of absorption, adsorption, liquefaction and membrane separation.

11. The process of claim 10, wherein the carbon dioxide capture step comprises membrane separation.

12. The process of claim 11, wherein the carbon dioxide capture step comprises two or more membrane separation steps.

13. The process of claim 10, wherein the carbon dioxide capture step comprises cryogenic condensation.

14. The process of claim 1, wherein the second portion of the exhaust stream is compressed to a pressure of up to about 5 bar before being passed across the feed side of the membrane.

15. The process of claim 1, wherein the sweep stream follows a sweep flow direction across the permeate side, the off-gas stream follows a feed flow direction across the feed side, and the sweep flow direction is substantially countercurrent to the feed flow direction.

16. The process of claim 1, wherein the membrane exhibits a carbon dioxide permeance of at least 500 gpu under process operating conditions.

17. The process of claim 1, wherein the membrane exhibits a selectivity in favor of carbon dioxide over nitrogen of at least 10 under process operating conditions.

18. The process of claim 1, wherein the vent stream comprises 3 vol % carbon dioxide or less.

19. The process of claim 18, wherein the vent stream comprises 2 vol % carbon dioxide or less.

20. The process of claim 1, wherein the membrane comprises two or more membranes, and the two or more membranes are arranged in one or more modules, and wherein the one or more modules are arranged in a vertical configuration.

* * * * *